United States Patent

Cuenot et al.

[11] Patent Number: 5,838,086
[45] Date of Patent: Nov. 17, 1998

[54] SYNCHRONOUS MOTOR WITH PERMANENT MAGNETS INCLUDED IN A ROTOR

[75] Inventors: Alain Cuenot; Alain Petitboulanger, both of Dijon, France

[73] Assignee: Parvex, Dijon, France

[21] Appl. No.: 499,913

[22] Filed: Jul. 11, 1995

[30]    Foreign Application Priority Data

Jul. 27, 1994 [FR] France ................... 94 09306

[51] Int. Cl.[6] ............... H02K 1/24; H02K 21/14
[52] U.S. Cl. ............ 310/156; 310/261; 310/162
[58] Field of Search .................. 310/156, 261, 310/162, 159, 152, 163, 154

[56]            References Cited

U.S. PATENT DOCUMENTS

| | | | |
|---|---|---|---|
| 4,358,697 | 11/1982 | Liu et al. ................... | 310/156 |
| 4,476,408 | 10/1984 | Honsinger ................. | 310/156 |
| 4,682,067 | 7/1987 | Oudet ....................... | 310/156 |
| 4,922,152 | 5/1990 | Gleghorn et al. ......... | 310/156 |
| 5,097,166 | 3/1992 | Mikulic .................... | 310/156 |
| 5,223,759 | 6/1993 | Shimoda et al. .......... | 310/156 |
| 5,650,680 | 7/1997 | Chula ....................... | 310/156 |

FOREIGN PATENT DOCUMENTS

0378162A1  7/1990  European Pat. Off. .

OTHER PUBLICATIONS

Robert C. Weast, Ed., CRC Handbook of Chemistry and Physics; p. E–108, 1983.

John D. Jackson, Classical Electrodynamics, pp. 820 and 821, 1975.

Primary Examiner—Thomas M. Dougherty
Assistant Examiner—Burton S. Mullins
Attorney, Agent, or Firm—Sughrue, Mion, Zinn, Macpeak & Seas, PLLC

[57]        ABSTRACT

A synchronous motor including permanent magnets inserted in a rotor, said permanent magnets having azimuth positions within said rotor and having radial magnetization, said rotor co-operating with a stator so as to define an air gap, said rotor and said stator being defined by poles, wherein flux produced by said permanent magnets propagates within the rotor along a first magnetic path F3 situated between said poles, said first magnetic path F3 having a reluctance lying in the range 0.5 times to 10 times the reluctance offered to the flux produced by said permanent magnets and propagating via said air gap.

5 Claims, 2 Drawing Sheets

SYNCHRONOUS MOTOR WITH PERMANENT MAGNETS INCLUDED IN A ROTOR

The present invention relates to a synchronous motor, and more particularly, to a synchronous motor adapted to operate at constant power, at high speed, and capable of accommodating a large central opening on the rotor axis.

BACKGROUND OF THE INVENTION

Operating a synchronous motor having permanent magnets at constant power is mentioned in the article by B. K. Bose entitled "Adjustable speed AC drives, a technology status review" published in the document Proceedings of the IEE, Vol. 70, No. 2, February 1982, New York, US, pp. 116–135.

With a synchronous motor, in order to obtain a large operating range at constant power, it is necessary to make use of a large phase advance.

With a traditional synchronous motor having permanent magnets, this large phase advance (up to 900) gives rise, in a motor that is unloaded, to too great a current, which current can exceed the thermal limit of the materials concerned and can present a considerable danger of the rotor magnet becoming demagnetized, thereby giving rise to a loss of performance and of reliability in such a machine.

The above-described solution also requires an installed electronic power supply controller to be selected which is very large compared with the mechanical power obtained, thus giving rise to a compromise that is economically unfavorable.

A special structure for a synchronous motor is described in the Applicants' French patent FR-2 641 654.

The motor which is adapted to operate at constant power is nevertheless incapable of achieving high speeds of rotation (maximum peripheral speed of about 300 km/h), because its mechanical construction is not strong enough to withstand the centrifuging of the motor. Further, the magnets which are disposed radially occupy the major fraction of the volume of the rotor, thereby making it impossible to release a large central hole in the rotor for receiving a very rigid shaft or for containing control members, e.g. mechanical members of a mandrel fixed on the axis of the rotor.

OBJECTS AND SUMMARY OF THE INVENTION

Thus, an object of the present invention is to provide a synchronous motor capable of operating at constant power over a wide range of speeds, e.g. between a given base speed $N_0$ and 20 times that value.

Another object of the present invention is to provide a synchronous motor capable of obtaining very high speeds of rotation.

For example, the speed achieved at the periphery of the rotor lies typically in the range 400 km/h to 600 km/h. The mechanical strength of the rotor to withstand centrifuging must therefore be very high, and iron losses at maximum speed must be small.

Another object of the present invention is to provide a synchronous motor enabling a rotor structure to be obtained that is suitable for leaving a large hole empty in the center of the rotor for the purpose of receiving a very rigid shaft.

For example, the diameter of the inside hole in a rotor lamination may be about 130 mm for a stator lamination having an outside diameter of 240 mm.

The above-noted objects are achieved by the present invention which provides a synchronous motor including permanent magnets inserted in a rotor, said permanent magnets having azimuth positions within said rotor and having radial magnetization, said rotor co-operating with a stator so as to define an air gap, said rotor and said stator being defined by poles, wherein flux produced by said permanent magnets propagates within the rotor along a first magnetic path F3 situated between said poles, said first magnetic path F3 having a reluctance lying in the range 0.5 times to 10 times the reluctance offered to the flux produced by said permanent magnets and propagating via said air gap.

The invention also provides a synchronous motor satisfying at least one of the following characteristics:

the reluctance offered to flux created by current flowing in said stator and propagating through the rotor via a second magnetic path F4 not passing via the permanent magnets lies in the range 1 to 10 times the reluctance offered to said flux and propagating via a third path F5 that passes via the magnets.

The magnetic path F3 offered to the flux from said permanent magnets inside the rotor is made of a ferrimagnetic or ferromagnetic material which generally surrounds said same pole magnets and which provides between said poles narrow link portions L1 that are magnetically saturated and of width $l_1$ and shape defined to adjust the value of the reluctance offered in the rotor to the flux from the magnets.

Each pole has at least two magnets per pole, each magnet being surrounded by a link of ferrimagnetic or ferromagnetic material, the width $l_2$ of said magnetic link between the magnets of the same pole being defined to ensure mechanical strength against centrifugal forces.

A hollow is provided in the center of said rotor with a diameter lying in the range 0.2 times to 0.6 times the outside diameter of a stator lamination.

The type of structure proposed makes it possible to design a motor having a hole made in the center of the rotor whose diameter lies in the range 0.2 times to 0.6 times the outside diameter of a stator lamination.

An advantage of the synchronous motor of the invention is that its structure makes the following possible:

to achieve the torque, speed, and power characteristics with current that remains within the limits that can be accommodated by the motor;

to preserve the state of magnetization of the permanent magnets of the rotor, i.e. to avoid any risk of demagnetization; and to optimize the ratio between the installed power of the electronic power supply controller and the mechanical power obtained on the shaft.

BRIEF DESCRIPTION OF THE DRAWINGS

The invention will be well understood from the following explanations given with reference to the accompanying drawings, in which.

MORE DETAILED DESCRIPTION

Figure 1:
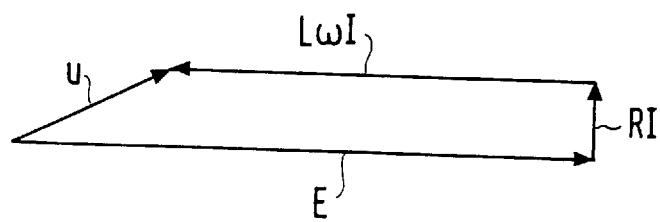
FIG. 1 is a vector diagram showing how a synchronous motor operates with a phase advance of 90 degrees.

In a permanent magnet synchronous motor for which it is desired to make use of a large phase advance, e.g. 90°, the vector diagram at some arbitrary operating point is as shown in FIG. 1, where:

E=the electromotive force (emf) of the motor;

U=the potential difference across the terminals of the motor windings; and

L, R=the inductance and the resistance of the motor.

The emf E is an intrinsic characteristic of the motor.

The potential difference U is set by the variable-speed controller. Its value is liable to be change depending on requirements.

The inductance L is likewise an intrinsic characteristic of the motor.

The current I is a resultant.

To obtain an operating range of 20 or more it is necessary for the amplitude of the vector U to be capable of achieving a value that is 20 times smaller than the amplitude of the vector E, i.e. that the amplitude of the vector L$\omega$I (ignoring the value of the vector RI which remains small) can achieve about $19/20$ of the amplitude of the vector E.

At a given speed, with the above conditions being satisfied, the value of the current I remains within the limits acceptable by the motor.

Provision should therefore be made to construct a motor such that its self-inductance satisfies these conditions without adding inductance external to the motor and in series therewith.

If a minimum value of inductance were to be obtained by adding an inductor externally to the motor, the current would indeed be reduced to the desired value, but that solution would lead to two major drawbacks:

a) excessive voltages across the terminals of the motor windings; and b) unacceptable losses when operating at high speed.

Since the vector L$\omega$I is to take values that are equal to or greater than $19/20$-ths of the vector E, the vector U is necessarily small compared with the vector E. This vector represents the flux that results from the effects in the stator windings of the current I plus the flux from the permanent magnets, and the vector E is representative of the flux created by the permanent magnets of the rotor on their own in the stator (in the absence of any current in the stator windings). This reduction of the magnetic flux created by the stator under the action of the current can reduce the effectiveness of the magnets of the rotor and can bring them close to their demagnetization threshold.

Under such conditions, if a magnetic circuit is not provided in the rotor to convey the magnetic flux of the magnets, or if a magnetic circuit is not provided to convey the flux created by the stator current which does not pass via the magnets, then the magnets need to work at the demagnetization limit, a situation which is precarious for the performance and the reliability of the motor.

The permanent magnet synchronous motor proposed for this operation is constituted by a stator and a rotor. The rotor being constructed in such a manner that, when the phase advance reaches large values and the current I reaches high levels, 1) a large fraction of the flux from the permanent magnets continues to travel via magnetic paths provided in the rotor, and 2) the flux created by the current I travels in part via the magnetic path provided in the rotor and does not pass via the permanent magnets, thereby eliminating the risk of demagnetization.

Figure 2:
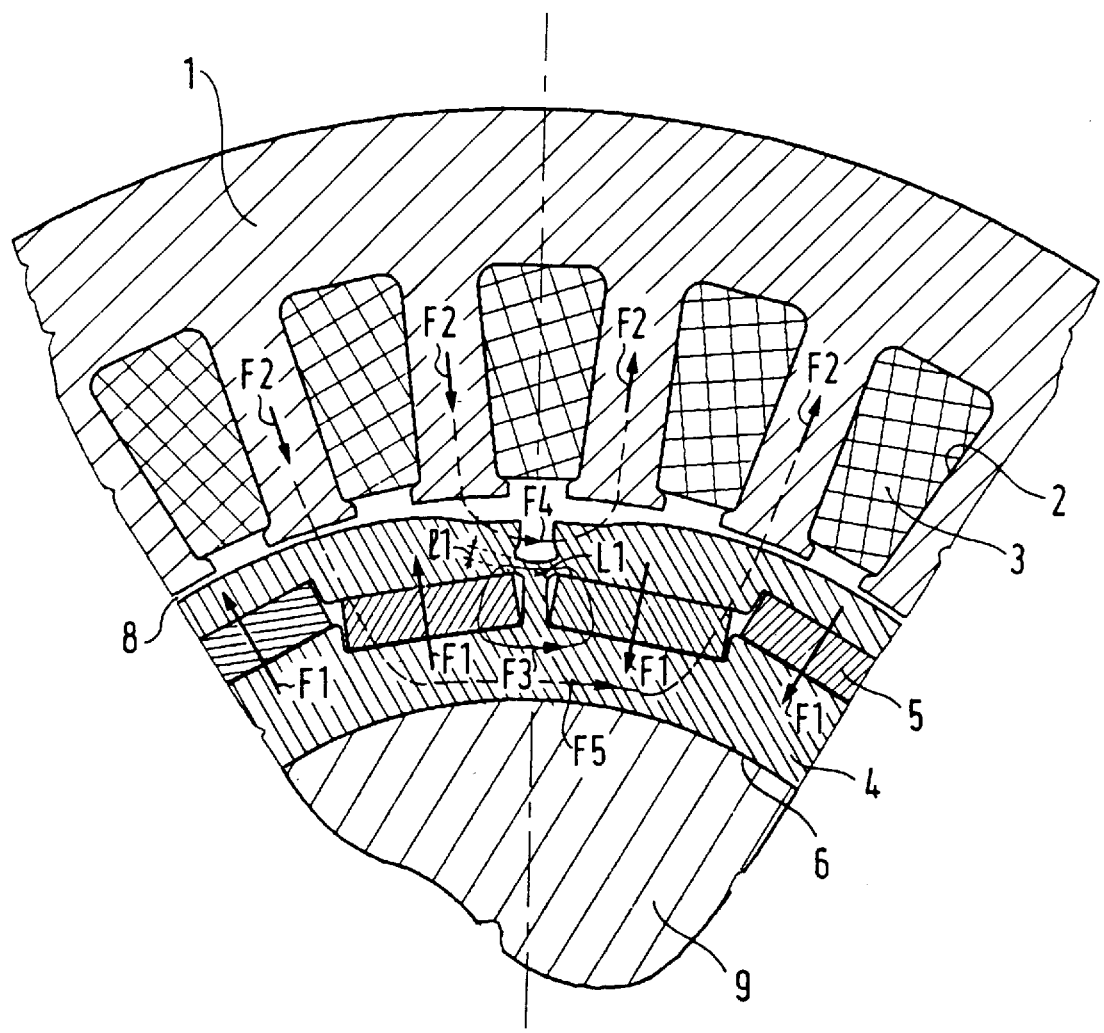
FIG. 2 is a cross-section of a first preferred embodiment of the permanent magnet synchronous motor of the invention.

An example of a synchronous motor according to the present invention is shown in FIG. 2.

Reference numeral 1 designates a stator body provided with slots 2 in which windings 3 are received.

Reference numeral 4 designates rotor laminations that are cut and stacked to define housings in which permanent magnets 5 are placed. The permanent magnets are magnetized in the radial direction, i.e. perpendicularly to the axis of the motor and substantially perpendicularly to a plane containing the magnet.

Reference numeral 6 designates the central hole of the rotor in which there is received either a solid shaft 9 (FIG. 2) or else a hollow shaft 7 (FIG. 3) suitable for receiving a known control unit (not shown).

Reference numeral 8 designates the air gap between the rotor and the stator.

Arrows F1 designate the magnetic flux from the permanent magnets of the rotor, while arrows F2 represent the magnetic flux created by the windings 3 of the stator.

It can be seen that the configuration of the motor of the present invention runs no risk of demagnetizing the permanent magnets for two reasons. Firstly, the flux from the magnets is looped by following a loop-closing path designated by arrow F3.

The Applicants have observed that operation is made optimum by giving the loop-closing path in the rotor for the magnetic flux from the permanent magnets a reluctance R2 that lies in the range of 1 to 10 times the reluctance R1 offered to the flux from the magnets via the air gap.

A person skilled in the art will readily understand how to select the nature, the width 11 and the shape of the link element L1 to enable the above conditions to be achieved.

Secondly, a portion of the flux created by the stator winding 3 may loop via the magnetic bypass path designated by arrow F4. The Applicants have observed that operation is optimum when the winding flux bypass path is given a reluctance lying in the range of 1 to 10 times the value of the reluctance offered by the path passing via the permanent magnets and designated by arrow F5.

The magnetic path offered to the flux from the permanent magnets inside the rotor is advantageously implemented by ferrimagnetic or ferromagnetic material generally surrounding permanent magnets of the same pole and having between poles magnetically-saturated narrower zones of a width 11 that is defined to adjust the value of the reluctance offered in the rotor to the flux from the permanent magnets.

Figure 3:
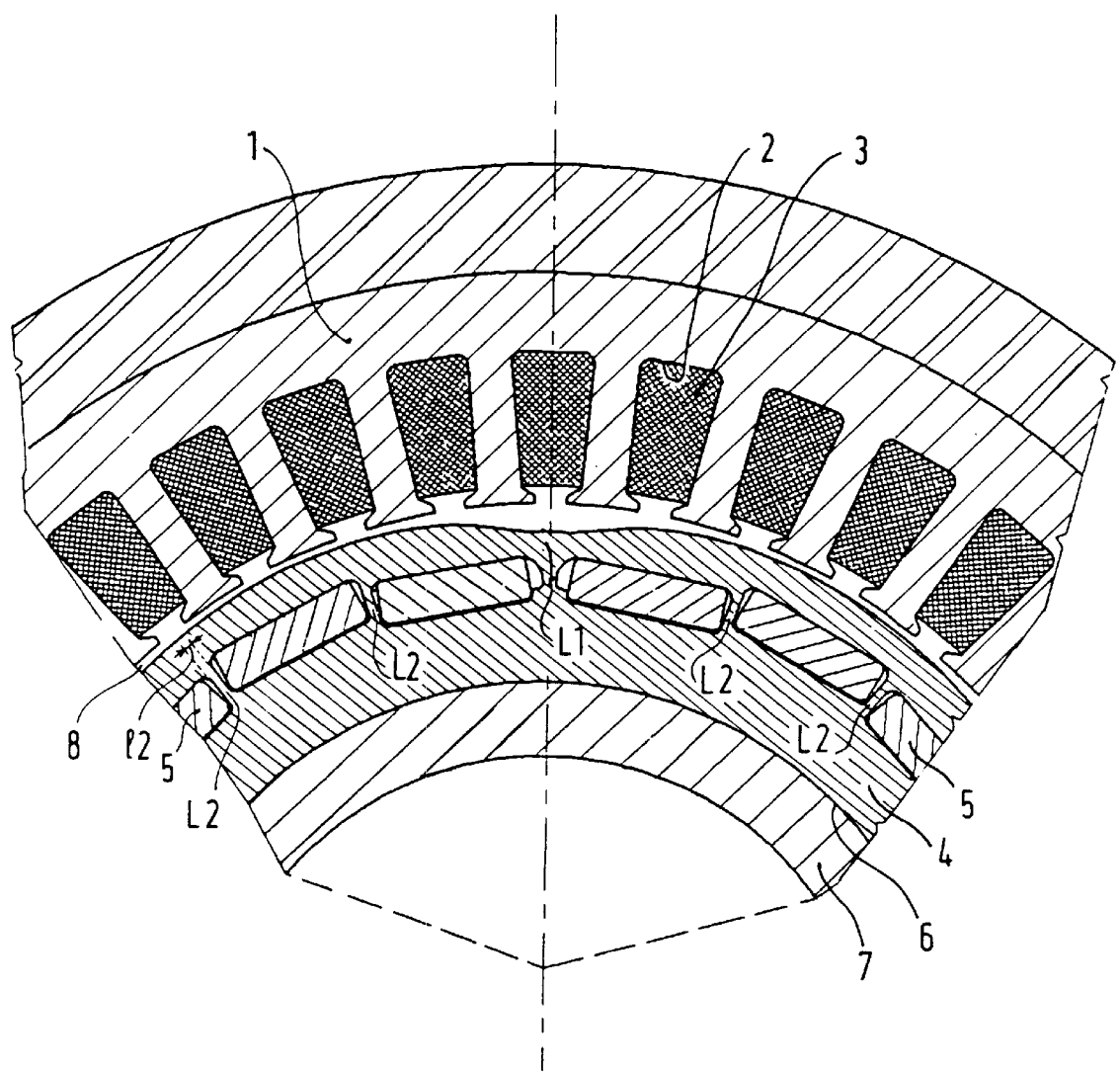
FIG. 3 is a cross-section of a second preferred embodiment of the synchronous motor of the invention.

FIG. 3 shows another disposition of the synchronous motor of the invention in which an additional link L2 has been created between the permanent magnets. This link creates a magnetic path for the flux from the permanent magnets like the link L1 and strengthens the rotor against centrifugal forces.

Advantageously, each pole may have at least two permanent magnets per pole, each magnet being surrounded by ferrimagnetic or ferromagnetic material, the width 12 of the magnetic zone between the magnets of the same pole being defined to provide mechanical strength against centrifuging.

FIGS. 2 and 3 show clearly the space that can be left at the center of the rotor shaft because of the special disposition of the magnets.

What is claimed is:

1. A synchronous motor comprising:

a rotor;

a stator defined by poles and cooperating with said rotor to define an air gap;

permanent magnets arranged in said rotor, said permanent magnets having azimuth positions within said rotor and having radial magnetization;

said rotor being defined by poles and each rotor pole containing one or several of said permanent magnets, wherein flux is produced between each pair of adjacent poles of said rotor, and wherein said flux propagates within said rotor along a first magnetic path (F3) situated between said poles of said rotor, said first magnetic path (F3) having a reluctance lying in a range 0.5 times to 10 times the reluctance offered to the flux produced by said permanent magnets and propagating via said air gap.

2. The synchronous motor according to claim 1, wherein the reluctance offered to flux created by current flowing in said stator and propagating through said rotor via a second magnetic path (F4) not passing via said permanent magnets lies in a range 1 to 10 times the reluctance offered to said flux and propagating via a third magnetic path (F5) that passes via said permanent magnets.

3. The synchronous motor according to claim 1, wherein said first magnetic path (F3) offered to the flux from said permanent magnets inside said rotor is made of one of a ferrimagnetic material and a ferromagnetic material and which provides, between said poles of said rotor, narrow link portions L1 that are magnetically saturated and of width $l_1$ and shape defined to adjust the value of the reluctance offered in said rotor to the flux from said permanent magnets.

4. The synchronous motor according to claim 1, wherein each pole has at least two permanent magnets per pole, each permanent magnet being surrounded by a link of one of ferrimagnetic material and a ferromagnetic material, the width $l_2$ of said link between permanent magnets of a common pole being defined to ensure mechanical strength against centrifugal forces.

5. The synchronous motor according to claim 1, wherein said rotor comprises a hollow opening in the center of said rotor with a diameter lying in the range 0.2 times to 0.6 times the outside diameter of said stator.

* * * * *